United States Patent [19]

Roemer

[11] 3,944,301

[45] Mar. 16, 1976

[54] LUBRICATING POCKET

[76] Inventor: Erich Roemer, c/o Gyco-Metall-Werke, Daelen and Loos GmbH, Wiesbaden-Schierstein, Germany

[22] Filed: Oct. 8, 1974

[21] Appl. No.: 513,143

[30] Foreign Application Priority Data
Oct. 20, 1973 Germany............................ 2352750

[52] U.S. Cl.............................. 308/5 R; 308/DIG. 9
[51] Int. Cl.²............................................ F16C 1/24
[58] Field of Search............... 308/5 R, 5 V, DIG. 9; 184/5, 100

[56] References Cited
UNITED STATES PATENTS
2,572,021  10/1951  Folz..................................... 184/5 X
3,581,728  6/1971  Abraham et al..................... 308/5 V Primary Examiner—M. H. Wood, Jr.
Assistant Examiner—Gene A. Church
Attorney, Agent, or Firm—Strauch, Nolan, Neale, Nies & Kurz

[57] ABSTRACT

A sliding bearing has a pocket recessed into the bearing surface and an edge of the pocket over which oil is supplied to the bearing surface is in the form of a wavy sinuous or sharper sawtooth-like line, with the discharge points being indentations extending in the direction of motion of the component supported for sliding on the bearing surface.

5 Claims, 5 Drawing Figures

LUBRICATING POCKET

This invention concerns improvements in a sliding bearing, namely a sliding guide with an oil supply reservoir.

Sliding bearings have a high lubricant consumption and a high starting torque because of the relatively dry starting friction. For this reason, the formation of lubricating pockets in relatively sliding surfaces is of considerable importance, in order to assure a rapid distribution of the oil.

To accomplish this, in a known form the discharge edges of these lubricants pockets are made well rounded, so that the discharge of the oil from the lubricating pocket may reach the adjacent bearing surface easily and rapidly. In order to obtain such discharge for the oil pocket, which has an approximately tangential fit with the bearing surface this rounding must largely be produced manually. Because of this manual work, production costs are considerably increased and usually the determined exact shape cannot be produced or reproduced, so that different conditions in functional capability result for each bearing. Another disadvantage is the considerably lesser throughput capacity of the hand work. The use of machines is possible, but very expensive mechanisms are necessary for this purpose, because, during production, either the bearing or the spindle which is used for the boring must be moved.

In the case of another known form of lubricating pocket, the discharge edge is not straight, but continuous with parabolic or hyperbolic curvature. For the most part, this form of lubricating pocket is formed in the axial direction and it is made primarily because of the straining of dirt from the lubricant in the bearing shell.

The production of the known inlet edge which is provided with a radius, in the case of segmented bearings as well as axial bearings which also consist of individual segments, can be carried out only with great difficulty. For this reason, sometimes the inlet edge is formed with a chamfer at the transition from the lubricating pocket to the bearing surface or to the bearing segment, instead of a radius; this is much easier to produce, but it does not represent a satisfactory solution.

It is common in all of the foregoing known embodiments that the transition from the lubricating pocket to the continguous bearing surface is separated by a straight or only slightly curved line. This straight or slightly curved line of the inlet edge prevents a rapid distribution of the oil on the sliding surface.

It is therefore an object of this invention to provide a novel inlet edge for sliding bearings or sliding guides, in which the transition of the oil supply reservoir is so improved that a considerably better lubrication of the sliding surface is obtained, and use can be made of machines to form the edge without a considerable cost increase.

This is attained in accord with this invention by forming the transition of the oil supply reservoir to the bearing surface with effective indentations in the form of a wavy line, which may be sinuous or a sharper sawtooth line over at least a part of its length, and a considerably increased oil throughput can be obtained by means of this transition.

The centerline of these sinuous tooth curves or the sawteeth can also be carried out parabolically or hyperbolically. A relatively large number of these teeth results in a uniform oil distribution, and a reduction of the bearing surface area in the bearing, without interruptions, is only necessary to slight degree. In general, lubricating pockets are formed in an area in which there is no or only a light load on the bearing.

Experiments have also shown that, for example, in the case of a round hole with a machined chamfer, through which the lubricant is fed, the lubricant is not drawn from the lubricating hole into the bearing surface in approximately the direction of movement of the journal, but towards the side, at an angular range of 70° to 90° to the direction of the movement of the journal. This angle depends considerably on the lubricating film thickness and on the relative sliding velocity between journal and bearing shell. Similar observations could be made in experiments with oval lubricating holes. From this knowledge, additional experiments were carried out, in which the otherwise slightly curved boundary line, which is essentially perpendicular to the movement of the journal, was resolved into lines which deviate as little as possible from the direction of motion of the journal.

In order to attain this in a particularly favorable embodiment of the invention, the indentations preferably extend essentially in the direction of motion of the supported or guided component.

Within the scope of the invention, it is additionally of advantage if at least the inlet edge of the segments of segmented sliding bearings is formed with a transition to the bearing surface which runs at least in part in accordance with a wavy sinuous or sawtooth line.

In the case of segmented sliding bearings, multiple surface sliding bearings, or axial sliding bearings, the inlet edge of the segments, respectively the transition of an oilway or lubricating pocket to the bearing surface, can be provided with at least one indentation within the scope of this invention; it runs preferably in the direction of motion of the journal.

Some embodiments of the invention are further described by means of the drawings.

BRIEF DESCRIPTION OF DRAWINGS

FIG. 1 shows a bearing member B having an almost rectangularly configured recessed lubricating pocket 1 with a wavelike configured boundary or edge 6 of the transition 2 from the lubricating pocket 1 to the contiguous bearing surface 3. A supported component (not shown) is slidably guided upon and by surface 3 in the directions of the double ended arrow. The wavelike boundary can also be seen in FIG. 2 which is a view at the separating surface 4. As illustrated in FIG. 1, the boundaries can be connected with each other, or (not illustrated) they can be separately formed with distances between them.

As a further embodiment, FIG. 3 shows a sawtooth configuration of the lubricating pocket 5. In contrast with the discharge edge which is provided with radii in FIG. 1, the discharge edge of the lubricating pocket in FIG. 3 has indentation of a relatively pointed shape. As illustrated in FIG. 3, grooved depressions 7 can run through the lubricating pocket 5, or only sawtooth recesses (not illustrated) can be formed in the transition to the bearing surface 8. A single, very pointed groove could basically provide a good oil supply in the case of a relatively small bearing, but this may be unsuitable in most cases, because the long point would reach too far into the bearing surface of the bearing.

FIG. 4 also illustrates the sawtooth configuration of the grooved depressions 7, in a view on the separating surface 9.

FIG. 5 shows a thrust washer 10 with a very small area flat bearing surface 11. The lubricating pocket 12 is appropriately provided with a sawtooth 13 on both sides. In the case of the thrust washer 10, as shown in FIG. 5, the direction of rotation is oriented in opposite directions, so that a two-sided formation of the sawtooth is provided. However, it is also possible to form the lubricating pocket 12 with only one sawtooth 13, where rotation is oriented in one specific direction. The oil pocket or groove must not necessarily, but can be provided with a wedge surface. The pointed discharge (sawtooth) can be within the wedge surface, but it can also reach into the bearing surface which is parallel to the journal. Instead of the single pointed end, several can be used.

The production of such a wavy boundary line, in accordance with this invention, between a lubricating pocket and the contiguous bearing surface can be easily carried out by a profile cutter or the assembly of several profile cutters and is particularly suitable for the production of bearing shells in large numbers. In this manner, hand finishing is completely unnecessary, whereby the production of these components by a machine process is not only considerably more economical, but also brings with it enormous advantages for the functional capability of sliding bearings because of the exact maintenance of the particular shape which has proven to be correct under constantly uniform conditions.

An essential advantage also prevails when the bearings are bored only after their installation, because a machine refinishing of the oil pockets is then no longer possible.

The described wavy forms of the boundary line between a lubricating pocket and the contiguous bearing surface of a sliding bearing brings advantages in practically all cases where an oil reservoir abuts a bearing surface, i.e. not only in the case of lubricating pockets, but also in the case of grooves and other transitions in which oil is to be fed to the bearing sites of a sliding bearing, each as a sliding guide, thus, for example, on the lead-in edges of the bearing surfaces of segmented bearings. In the case of segmented bearings it is of advantage when at least the lead-in edge of the segments is formed with a transition to the bearing surface which at least partially corresponds to a wavy line.

Figure 1:
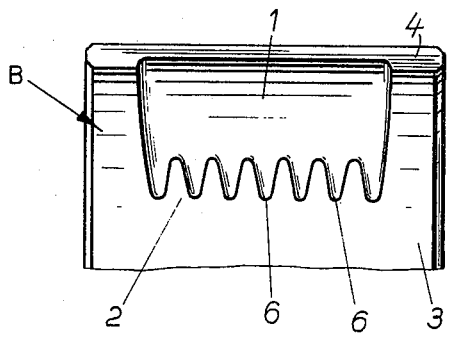
FIG. 1 is a plan view showing a bearing member having a lubricating pocket formation with wavy boundary according to a preferred embodiment.
Figure 3:
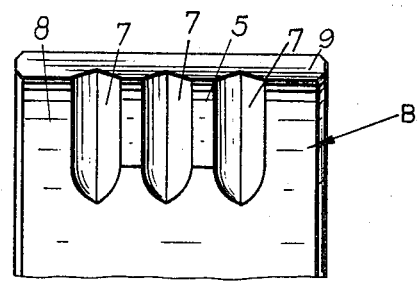
FIG. 3 is a plan view showing a lubricating pocket formation with sawtooth configuration.
Figure 2:
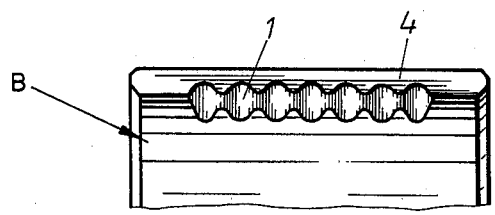
FIG. 2 is a view showing the boundary arrangement at the separating surface of a lubricating pocket in accord with FIG. 1.
Figure 4:
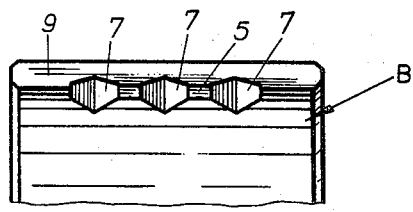
FIG. 4 is a view showing the boundary arrangement at the separating surface of a lubricating pocket in accord with FIG. 3.
Figure 5:
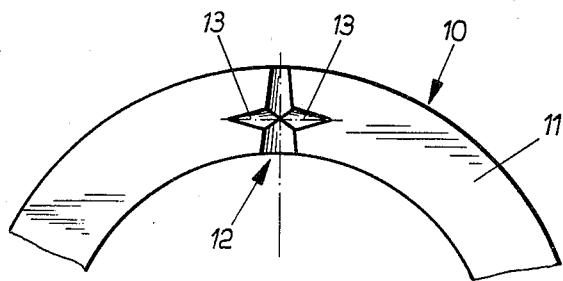
FIG. 5 illustrates a sawtooth lubricating pocket embodiment in a thrust washer.

The advantageous effect of the wavy line boundaries of the lubricating pockets is believed to have the following explanation:

In the case of a straight or slightly curved axial boundary of the lubricating pocket, there is the danger of turbulence, especially in a sharp transition to the bearing surface, or also in the case of high sliding velocities. Because of the turbulence, the oil supply of the bearing is inhibited. The resolution of the straight or slightly curved boundary line into waves or sawteeth according to the invention prevents the development of these turbulences, and thus improves the oil supply of the bearing surface of the bearing considerably. In the claims the designation of the boundary edge between the pocket and the adjacent bearing surface as "wavy" includes both the rounded sinuous type wave of FIG. 1 and the sharper sawtooth type wave of FIG. 3.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A sliding bearing comprising a slide bearing surface over which a component is adapted to slide and wherein a lubricating oil reservoir and distribution pocket is recessed into the slide bearing surface, characterized by a transition area between said pocket and said bearing surface with at least one extension of said pocket protruding into said bearing surface within said transition area to form a boundary edge of said pocket with respect to said bearing surface extending in a wavy line along said surface.

2. A sliding bearing in accord with claim 1, characterized in that said wavy line defines indentations extending into the surface substantially in the direction of motion of a supported or guided component on the bearing surface.

3. A sliding bearing in accord with claim 2, with a lubricating pocket in the bearing surface characterized in that the lubricating pocket is provided with a transition to the bearing surface, which is in the form of a wavy line, at least on its side edge which is disposed in the direction of motion of the supported or guided components.

4. A sliding bearing in accord with claim 1, in the form of segmented sliding bearing, characterized in that at least the lead-in edges of the segments are each formed with a transition to the bearing surface which at least partly corresponds to a wavy line.

5. A sliding bearing in accord with claim 1 in the form of a segmented sliding bearing, multiple surface sliding bearing, or axial sliding bearing, characterized in that at least one wavy line indentation extends in the direction of motion of the guided component, and is provided on the lead-in edges of the segments.

* * * * *

UNITED STATES PATENT AND TRADEMARK OFFICE
CERTIFICATE OF CORRECTION

PATENT NO. : 3,944,301
DATED : March 16, 1976
INVENTOR(S) : Erich Roemer

It is certified that error appears in the above-identified patent and that said Letters Patent are hereby corrected as shown below:

Column 4, line 51, change "components" to --component--.

*Signed and Sealed this*

Third *Day of* August 1976

[SEAL]

*Attest:*

RUTH C. MASON
*Attesting Officer*

C. MARSHALL DANN
*Commissioner of Patents and Trademarks*